Feb. 18, 1936.  H. F. VICKERS  2,030,902
HYDRAULIC STEERING GEAR
Filed Oct. 20, 1930  4 Sheets-Sheet 1
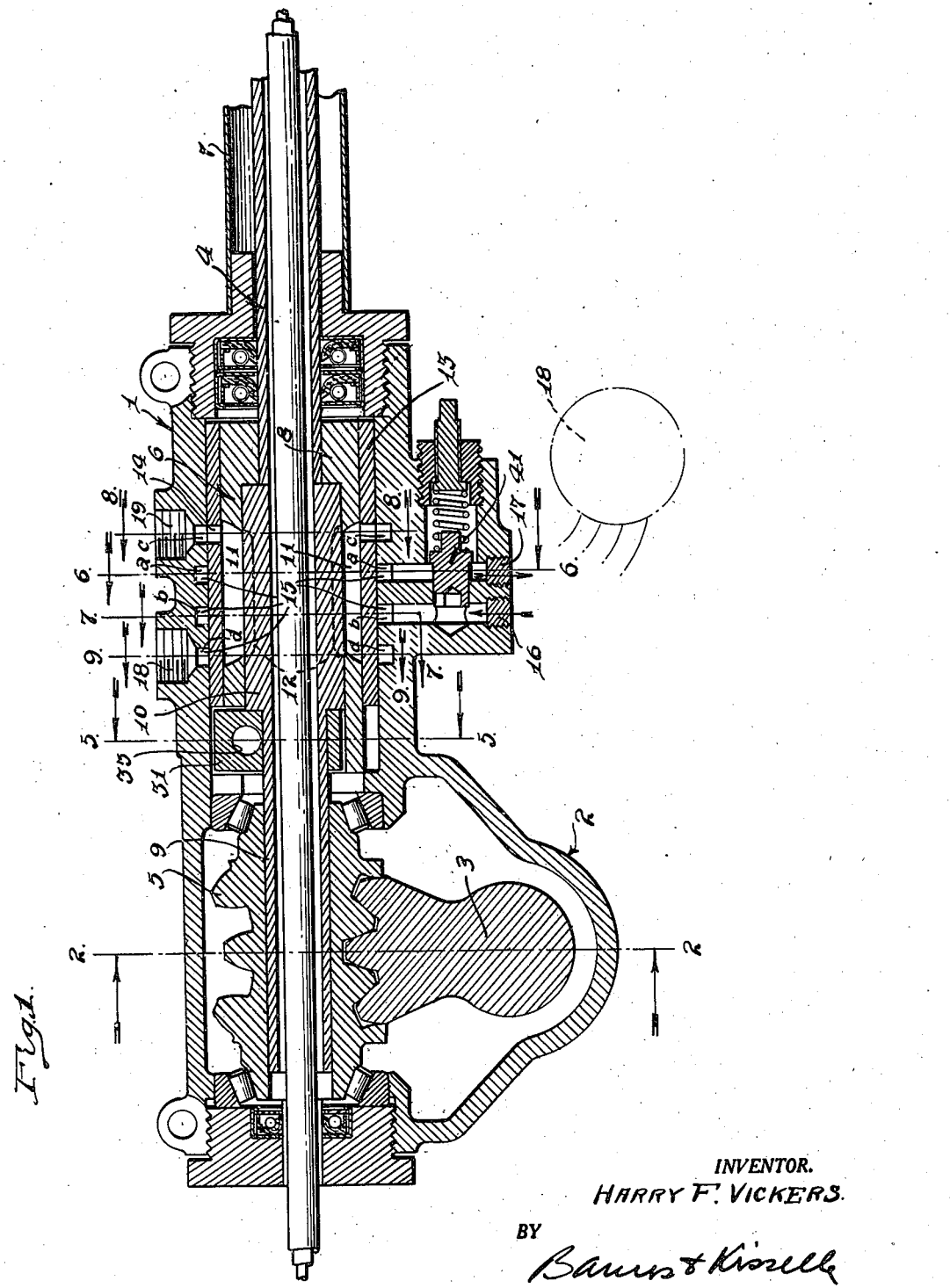
INVENTOR.
HARRY F. VICKERS.
BY
ATTORNEY.

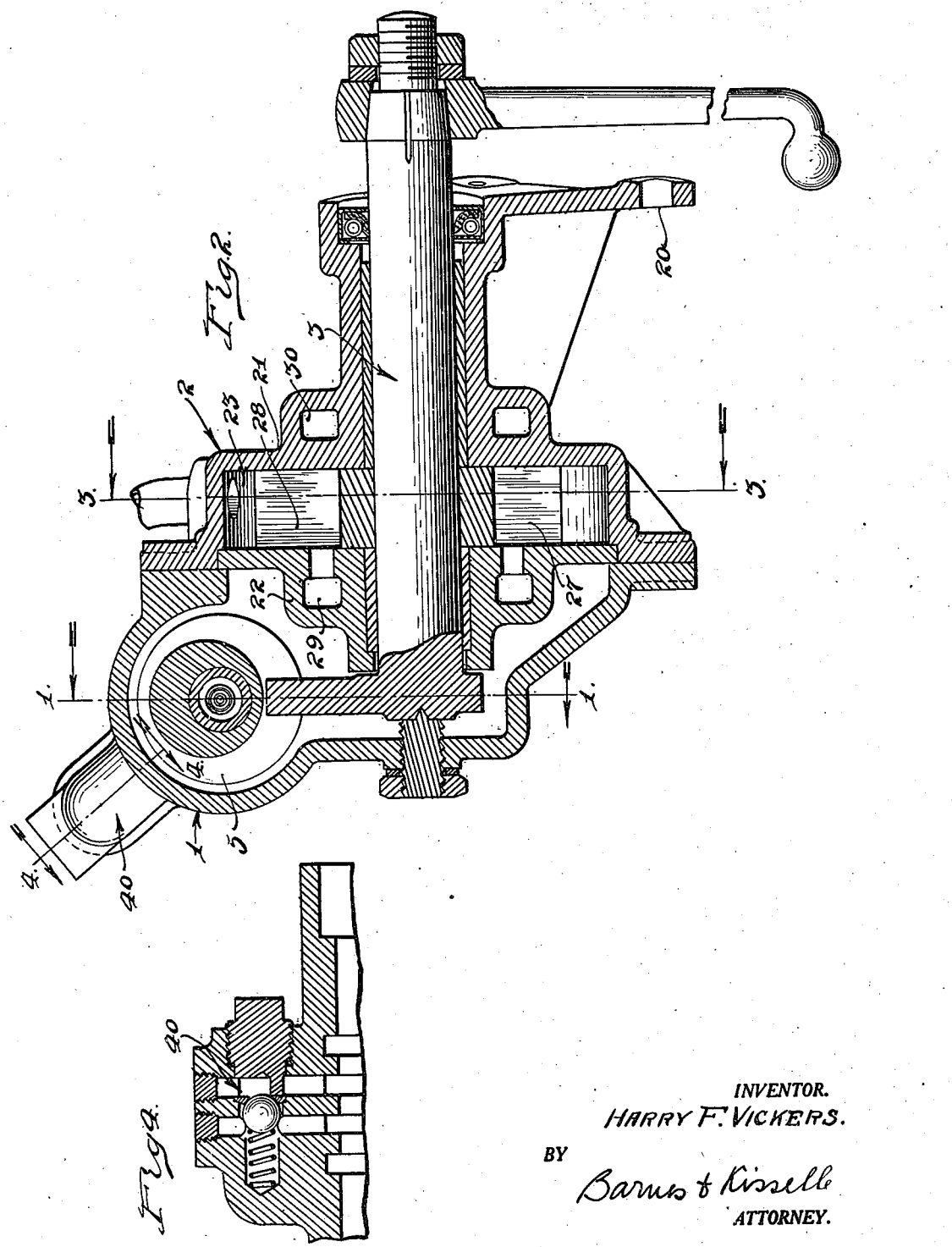

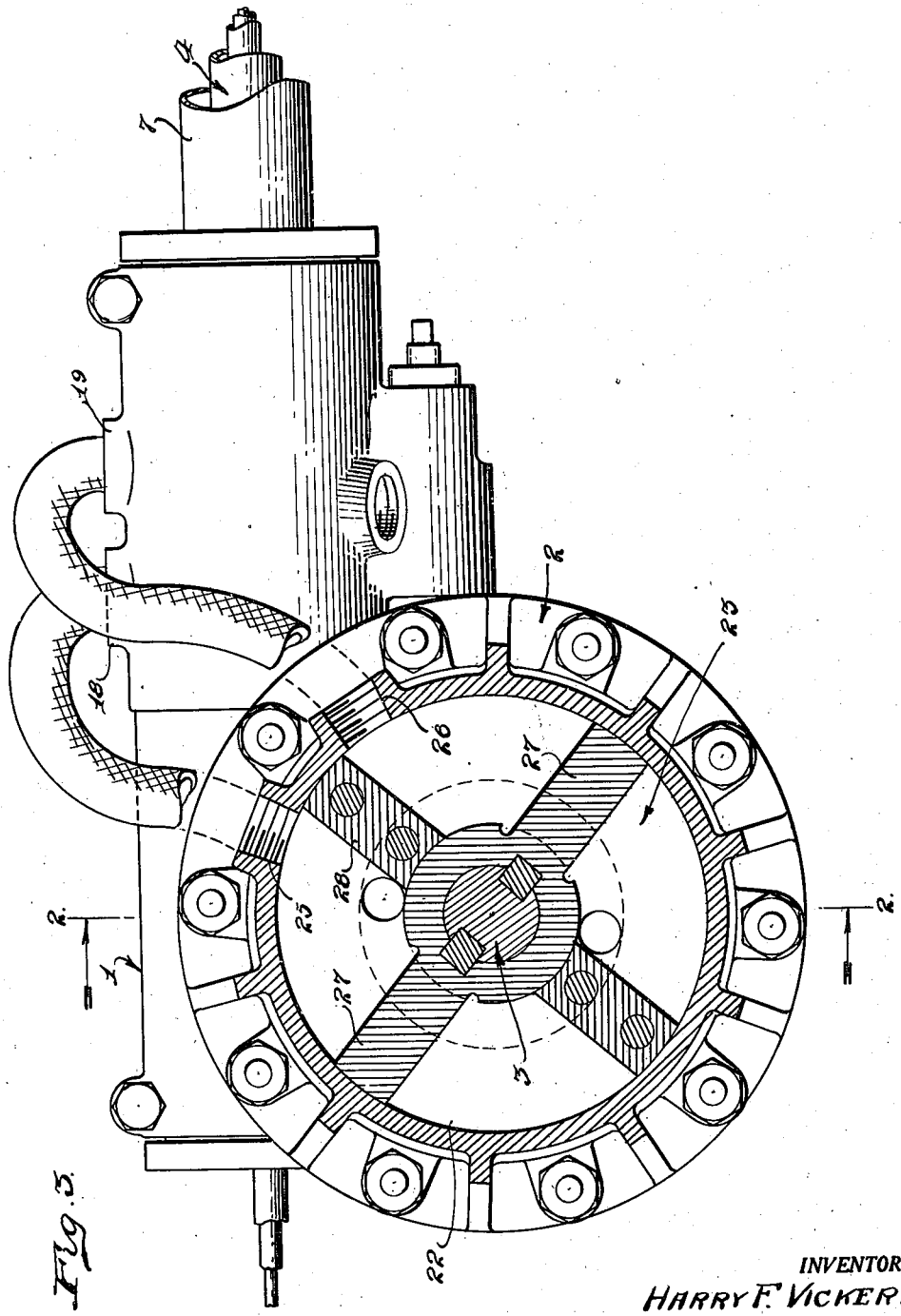

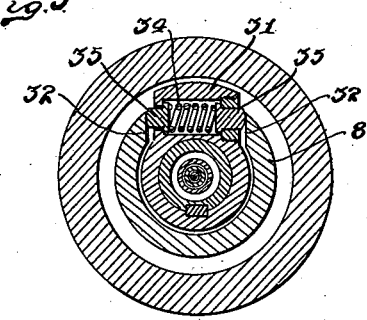
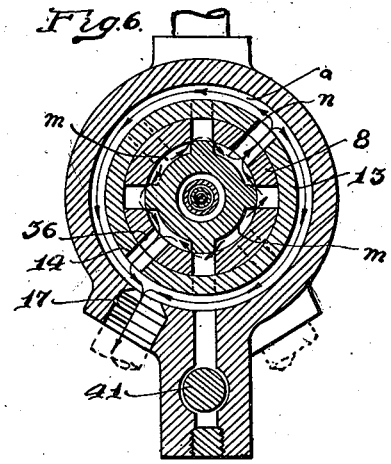
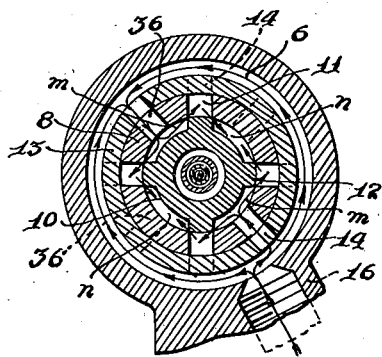
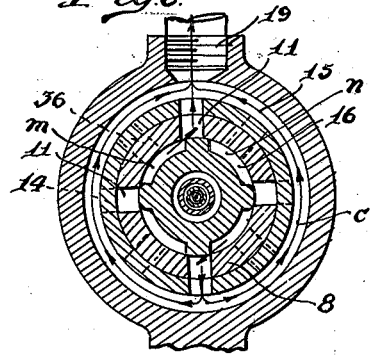
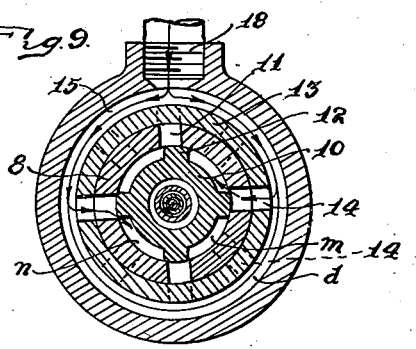

Patented Feb. 18, 1936

2,030,902

UNITED STATES PATENT OFFICE 2,030,902

HYDRAULIC STEERING GEAR

Harry F. Vickers, Detroit, Mich.

Application October 20, 1930, Serial No. 489,812

22 Claims. (Cl. 180—79.2)

This invention relates to hydraulic steering gear, and has to do particularly with a novel embodiment of hydraulic steering control with standard manually operated steering gear.

In my prior application Serial No. 400,712, I have disclosed hydraulic actuating mechanism including follow-up valve structure adapted to be used as a separate actuating unit for a manually operated steering gear unit together with means for positively neutralizing the control valve to eliminate any possible over-throw due to back lash.

It is the object of the present invention to provide means for accomplishing all the beneficial results as set forth in said prior application but with mechanism which is much more simple and compact and which is so designed as to become essentially embodied in the standard manually operated steering gear unit. In this case the dimensions, shape, and arrangement of my novel hydraulic steering gear are substantially a duplicate of the standard manually operated steering gear so that the cost of fabrication and assembly of my novel hydraulic steering gear is but very little more than the fabrication and assembly cost of the standard manually operated steering gear; the structure also marks a decided improvement in that it eliminates practically all accurate machining and at the same time hydraulically and positively controls and transmits the positioning of the steering wheel to effect accurate operation of the dirigible wheels.

Other features of the present invention reside in the mounting of the hydraulic operating means directly on the cross shaft; the embodying of the piston and cylinder construction as part of the housing cover; together with the general arrangement of the control valve and the connected operating parts, as will be more clearly brought out in the specification and claims.

In the drawings:

Fig. 1 is a longitudinal sectional view taken on line 1—1 of Fig. 2 and illustrating the relative arrangement of the control valve and operating parts and manner of positioning the same as a part of the steering gear housing.

Fig. 2 is a sectional view taken on line 2—2 of Fig. 1 and illustrating the preferred manner of mounting the actuating piston as a part of the housing cover.

Fig. 3 is a sectional view taken on line 3—3 of Fig. 2 and showing the cylindrical piston and cylinder structure and the manner of connecting the same with the control valve.

Fig. 4 is a sectional view taken on line 4—4 of Fig. 2 and illustrating the by-pass valve arrangement.

Fig. 5 is a sectional view taken on line 5—5 of Fig. 1 and showing details of the valve centering or neutralizing device.

Fig. 6 is a sectional view taken on line 6—6 of Fig. 1 showing the control valve in mid position with fluid flowing through the outlet.

Fig. 7 is a sectional view taken on line 7—7 of Fig. 1 also showing the control valve in mid position but illustrating the fluid flow from the inlet.

Fig. 8 is a sectional view taken on line 8—8 of Fig. 1 and showing the outer member of the control valve in open position whereby to direct fluid flow to the cylinder.

Fig. 9 is a sectional view taken on line 9—9 of Fig. 1 illustrating the fluid return from the cylinder when the valve is in the position shown in Fig. 8.

The gist of the present invention may be said to reside in the compactness of the hydraulic control and operating mechanism and the centering or neutralizing device for positively centralizing the control valve and eliminating any overthrow.

As best shown in Figs. 1, 2 and 3 my hydraulic steering gear follows very closely the general design and arrangement of a standard manually operated steering gear. The housing may be generally designated 1, the housing cover as at 2, the cross shaft as at 3, and the wheel shaft as at 4.

The housing member 1 is of the same general shape as the standard steering gear housing and is adapted to receive and support a worm member 5. The upper end of the housing 1 is slightly enlarged over general practice so that it can receive a control valve which may be generally designated 6 the detailed structure of which will be later described. This control valve 6 is adapted to separate the wheel shaft 4 and the worm 5, which in general practice are directly connected.

The wheel shaft 4 extends through the steering casing 7 and is adapted to be connected to the standard automobile steering wheel or similar member (not shown). The other end of the wheel shaft 4 is rigidly connected to the annular slotted sleeve 8 which forms part of the general valve structure 6. The worm 5 is keyed to a shaft 9 which shaft forms an extension of the cylindrical valve member 10. Thus the valve member 10 and shaft 9 are integrally formed or rigidly connected and the wheel shaft 4 and annular sleeve 8 are rigidly connected with the result that the relatively movable parts 8 and 10 of the valve 6 serve as a separating means between the shaft 4 and the shaft 9. The sleeve 8 contains four diametrically positioned slots 11 which, as best shown in Figs. 6 to 9, are adapted to cooperate with longitudinal valve members or ridges 12 of the cylindrical inner valve member 10. The slots 11 of the sleeve 8 are slightly wider than the ridges 12 of the valve 10 so that in normal neutral position the oil is free to flow from one depression in the valve 10 to the other depression, as best illustrated in Figs. 6 and 7.

A sleeve 13 is adapted to be secured to or forms a part of the sleeve 8 and this sleeve 13 is provided with a plurality of ports 14 both circumferentially and longitudinally spaced as will be presently described more in detail. The inner walls of the housing 1 are provided with spaced annular grooves 15 which are adapted to cooperate or align with the respective ports 14 of the sleeve 13. In other words, the longitudinally and circumferentially spaced ports 14 are so arranged as to at all times connect the depressions of the valve 10 with the proper annular grooves 15 regardless of the position of the wheel shaft 4 and the annular sleeve 8 connected thereto.

As best shown in Fig. 1, the housing 1 is provided with a suitable fluid inlet 16 and a fluid outlet 17. Any suitable pump as diagrammatically shown at 18 may be utilized for continuously supplying fluid to and from the housing. The design or location of this pump is immaterial as it does not enter into the present invention with the exception that it is adapted to continuously circulate the required amount of fluid through the hydraulic system. The inlet ports 16 and 17 are adapted to communicate with the center annular grooves 15, as best shown in Fig. 1, while the two outer annular grooves are adapted to cooperate with the ports 18 and 19 which control the flow of fluid to and from the operating cylinder.

As best shown in Fig. 2 the other main part of my steering gear assembly consists of the housing cover 2 which is so designed that it not only completes the housing and carries the cross shaft 3 but also is adapted to be bolted to the frame by means of the flanges 20. In the present invention I also utilize this cover 2 as a fluid operating cylinder. One part 21 of this housing cover is substantially identical with the standard housing cover of a manually operated steering gear in that it forms a flange, as best shown in Fig. 3, so that it may be bolted to the housing and also forms a bearing for carrying the cross shaft 3 and the flange 20 before bolting to the frame. Another part 22 of the housing may also form an additional bearing for the cross shaft 3 and so interfits with the member 21 as to form the third side of a cylinder which may be generally designated 23. As best shown in Fig. 3, the cylinder 23 is provided with suitable ports 25 and 26, which are connected by suitable conduits to the ports 18 and 19 in the housing 1. A multiple piston unit having diametrically positioned piston elements 27 is mounted on the shaft 3. The members 28 are stationary and preferably secured to the part 22 of the housing and thus form a part of the cylinder wall.

The members 21 and 22 of the housing cover are provided with annular passageways 29 and 30 and each passageway is provided with diametrically positioned ports for connecting the diametrically opposite spaces defined by the members 27 and 28. It will thus be obvious that as the fluid is pumped to and withdrawn from the operating cylinder that it will be pumped to and withdrawn from the diametrically opposite sides of the piston unit so that this unit is at all times balanced, with the result that it substantially floats within the cylinder and materially reduces friction and wear. It will be understood that the cylinder 23, the passageways 29 and 30, in fact the entire system, is always full of operating fluid with the result that when the movable valve member 8 is in central position, as shown in Figs. 6 and 7, the pistons will have equal pressure on both sides thereof, while when the valve 8 is moved one way or the other as illustrated in Figs. 8 and 9 there will be a differential pressure in the cylinder depending upon the direction of movement of the control valve. The forming of the cylinder as part of the housing cover permits the piston unit to be carried directly by the cross shaft with the result that the fluid in the cylinder absorbs all the shocks instead of the worm and worm gear segment and takes substantially all the load off of this worm and worm gear.

To insure the positive positioning of the dirigible wheels at the exact point comparable to the movement of the steering gear, and to eliminate all chances of over-running, I have provided a valve centering device, which is best shown in Fig. 5. As best shown in Fig. 1 the left end of the sleeve 8 is cut away to receive the centering lug 31. This end of the sleeve 8 and the centering lug require accurate machining to insure that the control valve will always be positively neutralized and centered, and these accurately machined parts are the only points of the entire unit requiring such accurate precision.

The finished surfaces 32 of the cut-away portion at the end of the valve sleeve 8 are spaced a predetermined distance from the finished sides of the center lug 31. It will be understood that there will only be actual contact between the surfaces 32 and the lug 31 when the fluid supply fails, in which case the actual positive contact between the sleeve 8 and the center lug 31 will serve to connect the two shafts 4 and 9 to provide for direct manually operated steering.

The lug 31 is fabricated to provide an aperture 33 for receiving a coil spring 34. At each end of the aperture 33 I have provided spacing members 35 which are normally held in positive contact with the end walls of the aperture 33 and at the same time contact with the finished sides 32 of the sleeve 8. It will thus be seen that with these parts accurately machined that the lug 31 will normally be positively centered between the finished walls 32 of the sleeve 8. The action between the control valve and the operation of the piston and indirectly the worm 5 and shaft 9 is substantially instantaneous with the result that the member 31 and the valve 10 will follow up any movement of the outer sleeve 8. As long as the steering wheel and the sleeve 8 is continuously turned in either direction the member 31 and valve 10 will continuously follow this movement but at the instant the steering wheel is stopped then the valve sleeve 8 will be positively retarded or centered and neutralized relative to the extension lug 31 with the result that the dirigible wheels will come to a stop at the exact point predetermined by the stopping of the steering wheel. If it were not for this centering device the friction between the cylindrical valve 10 and the valve sleeve 8 would tend to cause the valve sleeve 8 to move on past its intended stopping point, the amount of the back lash in the worm and worm gear, with the result that the dirigible wheels would over-run the mark determined by the operator of the steering wheel.

The operation of the control valve structure and the hydraulic unit in general may be best described by referring to Figs. 6 to 9 which represent sections taken on lines 6, 7, 8 and 9 of Fig. 1. The grooves 15 upon which these sections are taken may be numbered a, b, c, and d, respectively.

Fig. 7 is a section taken through the inlet port and shows the fluid coming into the port 16 and circulating around the annular groove b. The valve sleeve 8 with its outer sleeve 13 is shown in neutral or mid position. The sleeve 8 is provided with four slots 11 and four diametrically positioned apertures 36 equidistantly positioned between said slots. The outer sleeve 13 has eight apertures 14 which are in alignment with the slots 11 and apertures 36 of the sleeve 8, such apertures 14 and 36 being arranged so that they correspond with the proper grooves a, b, c, and d in the housing, as best shown in Fig. 1.

With the valve sleeve 8 in central position it will be obvious that the fluid will pass through the ports 14 of the sleeve 13 which are in alignment with the groove b, through the ports 36 of the sleeve 8 which are in alignment with the ports 14 and as the raised portions 12 of the valve 10 are of less width than the openings 11, the fluid will pass from the depressions m past the raised portions 12 and into the depressions n (see Fig. 7).

The fluid entering the depressions n will then pass out through the registering ports 36 and 14 and then by way of the annular groove a into the outlet conduit 17. Thus while oil will be constantly supplied equally to both sides of the piston in the cylinder 23 the continuous circulation of the fluid as shown in Figs. 6 and 7, permits the use of a continuously operating pump.

Now if the steering wheel should be turned the valve sleeve 8, as best shown in Fig. 8 will be moved relative to the central valve member 10 with the result that the outlet from the depressions m is confined to a single slotted portion 11 with the result that the fluid flowing into the depressions m from the inlet port 16 will be conducted through the conduits 19 and 26 to the cylinder 23 while the fluid in the other side of the cylinder will be relieved and pumped back through the conduit 18, annular groove d and into the depressions n where it is conducted back to the pump through the conduit 17. Actuation of the piston within the cylinder 23 will of course, in turn actuate the cross shaft to control the dirigible wheels. This movement will also be transmitted back through the shaft 9 so that the inner valve member 10 will follow up the outer valve member 8 until the steering wheel stops when the valve ports will be positively centralized by means of the mechanism shown in Fig. 5 so that they will assume the relation illustrated in Figs. 6 and 7.

The direction of flow of fluid to the operating cylinder will be controlled by the direction of movement of the control valve 8. A suitable adjustable bypass valve is shown as at 40 in Figs. 2 and 4 and an adjustable relief valve is shown as at 41 in Fig. 1. Such by-pass valve and relief valve provide for by-pass and relief of the fluid in case circulation is stopped or in case manual operation is necessary for any reason.

Following through the sequence of operations of the various parts when the steering wheel is turned; movement of the steering wheel shaft 4 will move the sleeve 8, as shown in Fig. 8, causing flow of liquid under pressure from the pump 18 through the various parts of the follow up valve, as indicated by arrows in Fig. 8, and out through the outlet 19. This same movement of the sleeve 8 will compress one of the spring pressed members 35, (see Fig. 5). Flow of liquid from the outlet port 19 to the cylinder (see Fig. 3) will cause actuation of the piston secured to the cross shaft 3 and this actuation of the cross shaft will result in movement of the dirigible wheels. In the initial directional movement of the steering wheel oil on the other side of one of the piston members 28 will be displaced to flow back to the pump through the follow valve as illustrated in Fig. 9. Hydraulic movement of the shaft 3 will result in actuation of the worm 5 and this worm 5 being directly connected to the central element 10 of the follow up valve will cause such element 10 to follow the movement of the sleeve 8 (see Figs. 1 and 5). As long as movement of the steering wheel continues, in one direction, the valve element 10 will follow the movement of the sleeve 8, the spring pressed member 35 being, of course, continually depressed so that the sleeve 8 is just ahead of the valve element 10. Now, if movement of the steering wheel shaft 4 should be stopped, the spring 34 will hold or retard the sleeve 8 at the exact point at which the steering wheel is stopped; in other words, the strength of the spring 34 is greater than any friction between the elements 10 and 8. It will be obvious that if there were no means for retarding the sleeve 8 that friction between the parts would cause the sleeve to move on past its intended stopping point, with the result that the parts would oscillate or wobble back and forth.

It will thus be seen that I have provided a hydraulic steering gear which is embodied as an integral unit in a steering gear housing and housing cover of the standard type. With the exception of the valve centering device, the parts require very little precision work. All parts of the hydraulic control and operating structure are compact and simple, and are so positioned and arranged as to add very little to the fabrication and assembly cost of the standard manually operated steering gear. The fluid operating means and control valve therefore provide ample power for any steering need and are so arranged as to be substantially wear proof.

What I claim is:

1. In a steering gear, the combination of a housing containing a wheel shaft a manually operated driving member and a follow up type control valve in axial alignment with said wheel shaft, a cover for said housing containing a driven operating member cooperating with said driving member and fluid operated means connected to said driven member, fluid supply means connected to said steering gear housing, and conduits for conducting the fluid through the control valve to the fluid operated means.

2. In a steering gear, the combination of a housing containing a wheel shaft a manually operated driving member and a control valve separating the wheel shaft and driving member, a cover for said housing containing a driven operating member cooperating with said driving member and fluid operated means connected to said driven member, fluid supply means connected to said steering gear housing, and conduits for conducting the fluid through the control valve to the fluid operated means within the cover.

3. In a steering gear, the combination of a housing containing a wheel shaft a manually operated driving member and a follow up type control valve positioned between the driving member and steering wheel, a cover for said housing containing a driven operating member cooperating with said driving member and fluid operated means connected to said driven member, fluid supply means connected to said steering gear housing, conduits for conducting the fluid through the control valve to the fluid operated means, and means connected to said driving member and cooperating with an extension of said valve for positively bringing the parts of the valve to a relatively neutral position.

4. A unitary combined hydraulic and manually operated steering gear, comprising a housing containing a steering wheel shaft and driving member, a cross shaft for transmitting the movement of the steering wheel to the device to be steered, fluid operated piston structure secured to said cross shaft, and a cylinder housing for said piston structure forming a cover for said housing and a mounting for securing the steering gear to the frame.

5. A unitary combined hydraulic and manually operated steering gear comprising a housing, a control valve and manually operated driving member oscillatable about a common axis and positioned in alignment within said housing said control valve being positioned between the steering wheel and driving member, a cross shaft for operating the device to be steered and having a driven member cooperating with said driving member, and fluid operated means mounted on said cross shaft and connected with said control valve.

6. A unitary combined hydraulic and manually operated steering gear comprising a housing, a control valve and manually operated driving member positioned in alignment within said housing, a cross shaft for operating the device to be steered and having a driven member cooperating with said driving member, fluid operated means mounted on said cross shaft and connected with said control valve, and a cover for said housing forming the cylinder walls of said fluid operated means.

7. A steering gear of the type having a housing containing a worm and a housing cover containing a worm wheel and cross shaft, comprising a wheel shaft and a shaft connected to said worm, a control valve having relatively movable parts, one part consisting of two external sleeves directly connected to said wheel shaft and the other part consisting of an internal member connected to said worm shaft, and fluid operated means secured to said cross shaft connected to said control valve.

8. A steering gear of the type having a housing containing a worm and a housing cover containing a worm wheel and cross shaft, comprising a wheel shaft and a shaft connected to said worm, a control valve mounted in said housing and having relatively movable parts, one part consisting of two external sleeves directly connected to said wheel shaft and the other part consisting of an internal member connected to said worm shaft, and fluid operated means secured to said cross shaft connected to said control valve.

9. A steering gear of the type having a housing containing a worm and a housing cover containing a worm wheel and cross shaft, comprising a wheel shaft and a shaft connected to said worm, a control valve having relatively movable parts, one part being directly secured to said wheel shaft and the other part to said worm shaft, fluid operated means secured to said cross shaft connected to said control valve, and a centering device positioned between the two movable parts of said control valve for normally and positively ensuring centering of said control valve parts.

10. A steering gear of the type having a housing containing a worm and a housing cover containing a worm wheel and cross shaft, comprising a wheel shaft a control valve having relatively movable parts, one part being connected to said wheel shaft and the other part to said worm, fluid operated means secured to said cross shaft connected to said control valve, a centering device positioned between the two movable parts of said control valve for positively insuring centering of said control valve parts, said centering device serving as the sole means for connecting the two shafts for manual operation of the steering wheel.

11. A combined hydraulic and manually operated steering gear, comprising a housing containing a wheel shaft a two part hydraulic control valve and worm mounted in alignment and oscillatable about a common axis, operating means adapted to be manually driven by said worm, fluid actuated means secured to said operating means and connected to and controlled by said control valve, and means in said housing and positioned between said wheel shaft and said worm for automatically neutralizing the control valve parts upon stopping of the wheel shaft whereby to prevent any friction between the control valve parts from causing an over-run of said parts.

12. A combined hydraulic and manually operated steering gear, comprising a housing containing a wheel shaft, a two part hydraulic control valve and worm mounted in alignment oscillatable about a common axis, operating means adapted to be driven by said worm in case of failure of hydraulic power, fluid actuated means secured to said operating means and connected to and controlled by said control valve, means in said housing and positioned between said wheel shaft and said worm for automatically aligning the control valve parts upon stopping of the wheel shaft, a pump for continuously supplying fluid to said control valve, and a relief valve forming part of said housing to insure the return of fluid to said pump in case the flow through the control valve is stopped.

13. A combined hydraulic and manually operated steering gear, comprising a housing containing a wheel shaft a multiple part hydraulic control valve and worm mounted in alignment and oscillatable about a common axis, operating means adapted to be driven by said worm in case of failure of hydraulic power, fluid actuated means secured to said operating means and connected to and controlled by said control valve, means in said housing and positioned between said wheel shaft and said worm for automatically insuring alignment of the control valve parts upon stopping of the wheel shaft, a pump for continuously supplying fluid to said control valve, and a relief valve forming part of said housing to insure the return of fluid to said pump in case the flow through the control valve is stopped, said control valve being fabricated to continuously conduct the fluid through the control valve and back to the pump when such valve is in normal neutral position.

14. A combined hydraulic and manually operated steering gear, comprising a housing containing a worm a control valve and wheel shaft oscillatable about a common axis, a housing cover containing a worm gear a cross shaft and fluid actuated means secured to said cross shaft, said control valve being formed of a plurality of relatively movable parts, one of said parts being connected to the wheel shaft and another part to said worm, and means positioned between said relatively movable parts for normally maintaining said parts in neutral position and serving as a connecting means between the wheel shaft and worm in case of failure of the hydraulic system.

15. A combined hydraulic and manually operated steering gear, comprising a housing containing a worm a control valve and wheel shaft, a housing cover containing a worm gear a cross shaft and fluid actuated means secured to said cross shaft, said control valve being formed of a plurality of relatively movable parts, one of said parts being connected to the wheel shaft and another part to said worm, and accurately machined means secured to said part connected to the worm and cooperating with accurately machined surfaces formed on said other part of said valve for positively insuring aligning and maintaining parts of said valve in neutral position when actuating power is removed from the wheel shaft.

16. A combined hydraulic and manually operated steering gear, comprising a housing containing a worm a control valve and wheel shaft, a housing cover containing a worm gear a cross shaft and fluid actuated means secured to said cross shaft, said control valve being formed of a plurality of relatively movable parts, one of said parts being connected to the wheel shaft and another part to said worm, and accurately machined means secured to said part connected to the worm and cooperating with accurately machined surfaces formed on said other part of said valve for positively aligning and maintaining parts of said valve in neutral position when actuating power is removed from the wheel shaft, said means also serving as the sole connecting means between the wheel shaft and the worm for permitting manual operation of the steering wheel in case of failure of the hydraulic system.

17. A combined hydraulic and manually operated steering gear, comprising a wheel shaft, a manually actuated driving member, a driven member and cross shaft for manually actuating the means to be steered, fluid actuated means secured to said cross shaft, a portion of the power transmitting means between the wheel shaft and the means to be steered being separate but connected by a fluid control valve, a portion of the valve being connected to one of said separated parts and a portion of the valve being connected to the other of said operated parts, and said two portions of the valve being relatively oscillatable so that one part of the valve acts as a core and the other as a sleeve; a continuously operated pump connected to said control valve, connections between said fluid control valve and said fluid actuated means whereby fluid power is used for all steering motions except when said fluid power fails, and a resilient means cooperating with said two control valve parts for permitting said two parts to separate immediately upon movement of the wheel shaft and effective upon said parts to retard one of said parts and permit the other part to catch up and assume neutral position relative to the other part when movement of the wheel ceases.

18. In a steering gear of the type having a wheel shaft and worm and a cross shaft and worm gear, the combination of a fluid control valve positioned between the wheel shaft and the worm, said valve being in alignment with and oscillatable about the same axis as said wheel shaft, fluid actuated piston and cylinder construction secured to said cross shaft, means for supplying pressure fluid to said control valve, said control valve being so arranged and connected to said piston and cylinder construction that fluid power is used for all steering motions except upon failure of said fluid power, said oscillatable control valve being formed at least of two parts, and resilient means cooperating with said two parts for permitting said two parts to move from their relatively neutral position immediately upon movement of the wheel shaft and effective upon said relatively moved parts to retard one of said parts and permit the other to catch up and assume a relatively neutral position when the movement of the wheel shaft has ceased.

19. In a steering gear of the type having a wheel shaft and worm and a cross shaft and worm gear, the combination of a fluid control valve positioned between the wheel shaft and worm and oscillatable about the same common axis as said shaft and worm, fluid actuated piston and cylinder construction secured to said cross shaft, means for supplying pressure fluid to said control valve, said control valve being so arranged and connected to said piston and cylinder construction that fluid power is used for all steering motions except upon failure of said fluid power, said control valve being formed at least of two parts, and resilient means cooperating with said two parts for permitting said two parts to move from their relatively neutral position immediately upon movement of the wheel shaft and effective upon said relatively moved parts to retard one of said parts and permit the other to catch up and assume a relatively neutral position when the movement of the wheel shaft has ceased.

20. A combined hydraulic manually operated steering gear comprising a housing containing a manually operable direction shaft and a hydraulic control valve and manually operable driving member mounted in alignment and oscillatable upon a common axis, operating means adapted to be driven by the manual operation of said member, fluid actuated means secured to said operating means and connected to and controlled by said control valve whereby fluid power is normally used for all steering motions, said control valve being formed in two parts, and resilient means cooperating with said oscillatable two parts for automatically aligning said two parts of the control valve upon stopping of the wheel shaft whereby to prevent any friction between the control valve parts causing an over run of one of said parts and a consequent fluid power movement of said operating means beyond that intended by the direction shaft.

21. A combined hydraulic and manually operated steering gear, comprising a housing containing a worm and wheel shaft, a housing cover containing a worm gear, a cross shaft and fluid actuated means secured to and oscillatable with said cross shaft, one of said shafts being separated and connected by a control valve formed of a plurality of relatively movable parts oscillatable about the axis of said separated shaft, fluid pressure means and means connected to said control valve and fluid actuating means whereby fluid power is used for all steering motions, and means positioned between said relatively movable parts for permitting immediate movement from relative neutral position upon movement of said wheel shaft and effective upon said moved parts to retard one of the parts and permit the other part to catch up and assume relative neutral position when the movement of the wheel shaft has ceased and also serving as a mechanical connecting means between the separated parts of the shaft in case of failure of the hydraulic system.

22. In a combined hydraulic and manually operated structure of the class described wherein fluid power is normally used for all operating motions and manual power is used for controlling the application of said fluid power and also for actuating the operating means in case of failure of fluid power, a housing, a manually actuated control shaft in said housing, an operating member positioned in alignment with said shaft and comprising a manually driven member in case of failure of fluid power and normally a power driven member, a control valve of the follow-up type positioned in said housing and in alignment with said shaft and said operating member, said shaft, operating member and control valve being oscillatable about a common axis, inlet and exhaust ports formed in said housing, and conduits for connecting said ports to a source of supply and to piston and cylinder construction and actuating a second operating member adapted to be driven by said first named operating member in case of manual operation and to drive said first operating member in case of normal fluid operation, said valve being formed of two parts one part being connected to said shaft and the other part to said first named operating member, cooperating ports in said valve parts for permitting continuous flow of liquid through the valve parts and to opposite sides of the piston when the operating means is stationary and adapted to direct liquid to opposite sides of the piston to actuate the same, upon relative movement of the valve parts, and resilient means cooperating with said two parts for permitting said two parts to move from their relatively neutral position immediately upon movement of the wheel shaft and effective upon said relatively moved parts to retard one of said parts and permit the other to catch up and assume a relatively neutral position when the movement of the wheel shaft has ceased.

HARRY F. VICKERS.